March 24, 1959  M. A. ORDORICA  2,878,903
BRAKE-ACTUATING MECHANISM FOR VEHICLES
Filed July 1, 1954  3 Sheets-Sheet 3
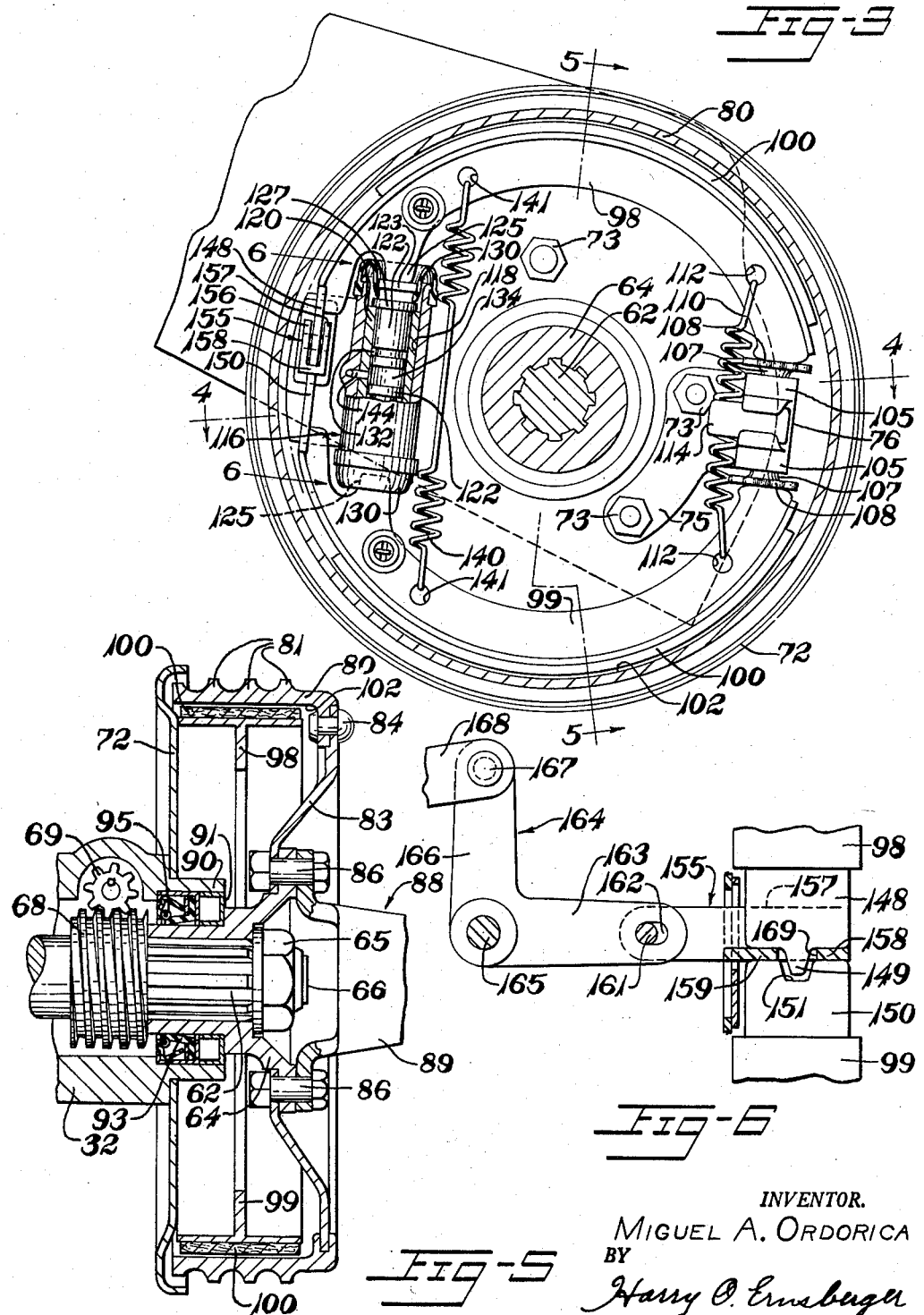
INVENTOR.
MIGUEL A. ORDORICA
BY
Harry O. Ernsberger
ATTY.

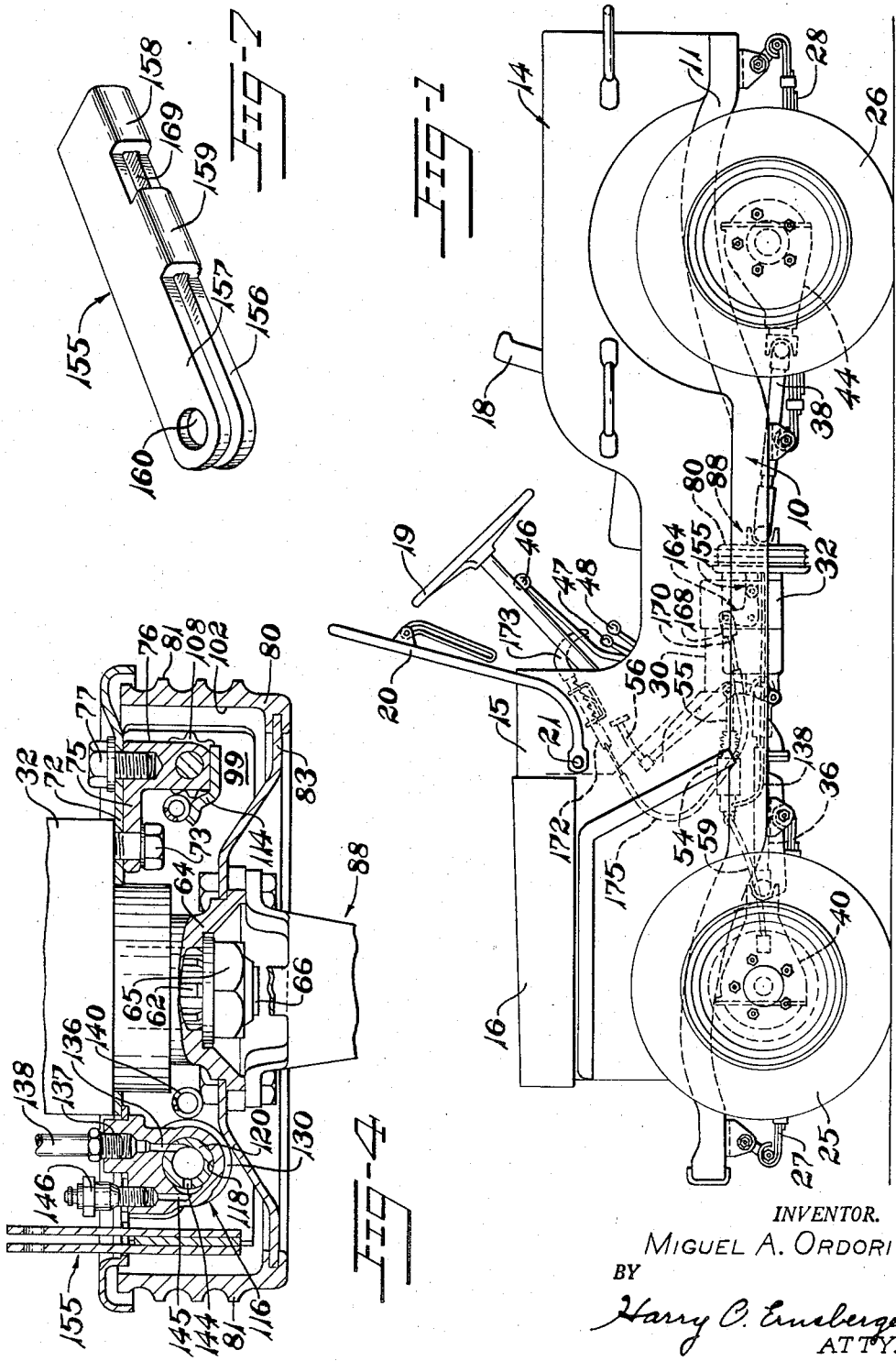

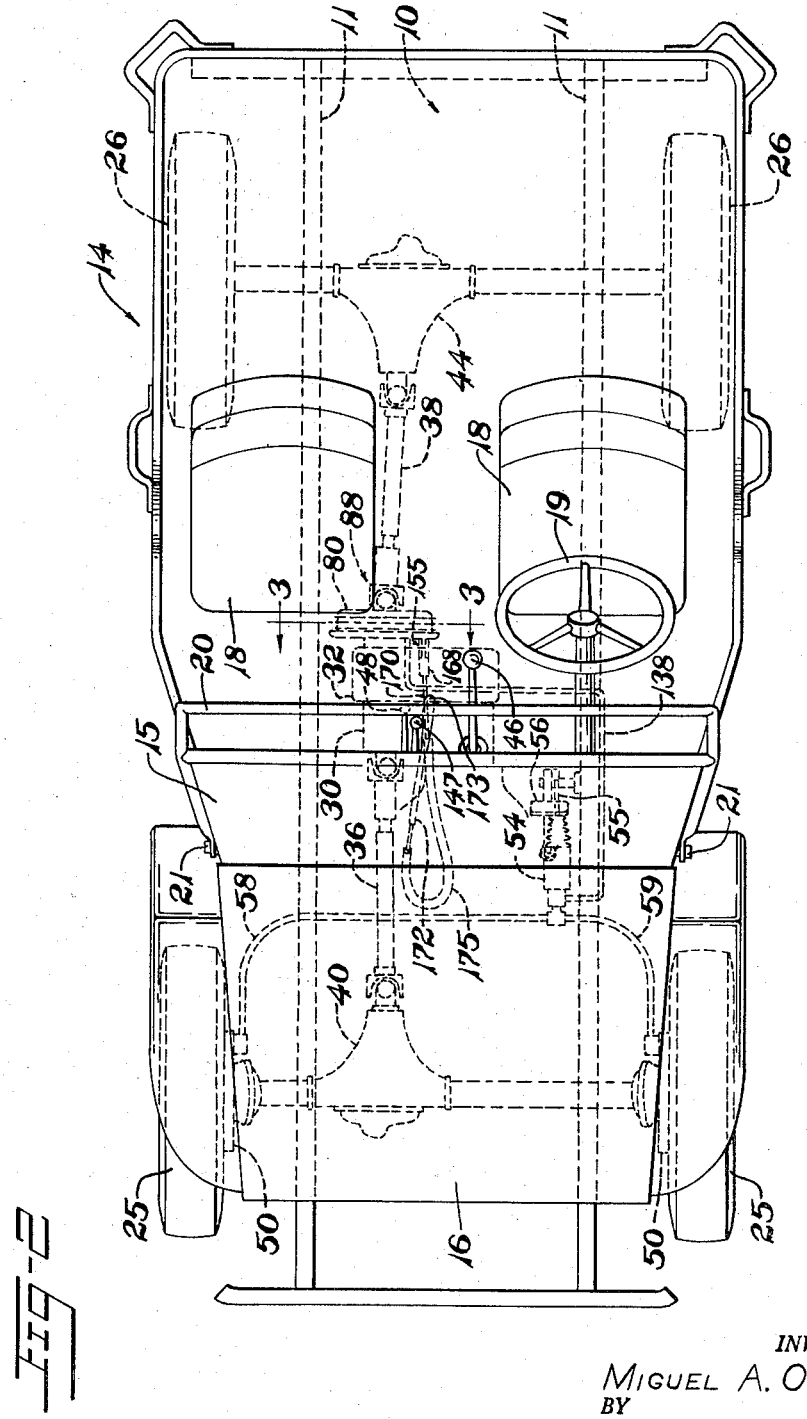

United States Patent Office

2,878,903
Patented Mar. 24, 1959

2,878,903

BRAKE-ACTUATING MECHANISM FOR VEHICLES

Miguel A. Ordorica, Toledo, Ohio, assignor, by mesne assignments, to Bank of America National Trust and Savings Association, San Francisco, Calif., as agent Application July 1, 1954, Serial No. 440,701

2 Claims. (Cl. 188—106)

This invention relates to brake-actuating mechanism for an automotive vehicle and, more especially, to a combined hydraulically actuated service brake arrangement for the propeller shaft of an automotive vehicle and manually operated means therefor.

It has been conventional practice on both two- and four-wheel-drive vehicles to equip each of the wheels with brake mechanism including brake drum and brake shoes and provide hydraulically actuated means for effecting simultaneous setting of the four braking mechanisms associated with the wheels. The parking or emergency brake arrangement now in conventional use is inclusive of a manually operable member or means, actuatable from the driver's compartment, which is usually connected by suitable cable or rod elements with the brake shoes of the rear wheels of the vehicle whereby the rear wheel brakes may be moved manually to set position through the connecting elements for emergency or parking purposes. Such manual means for actuating the rear wheel brakes, coupled with the hydraulic arrangement for actuating all of the vehicle brakes, is comparatively expensive and has the further disadvantage that the brake mechanism adjacent the wheels is unsprung weight.

The present invention embraces the provision of hydraulically actuated braking means effective on all four wheels of the vehicle but eliminating the braking mechanism at the rear wheels of the vehicle.

An object of the invention resides in a brake mechanism associated with the propeller shaft construction for driving the rear wheels of the vehicle wherein an effective braking action on the vehicle propeller shaft is effective to transmit braking action to the rear drive wheels through the live or drive axles without the use of individual brake shoes and associated mechanism adjacent the rear wheels.

Another object of the invention resides in the provision of a propeller shaft braking system which may be hydraulically actuated concomitantly with the hydraulic actuation of the braking mechanism at the front wheels of a vehicle to accomplish service-braking operations in conjunction with manually controlled means intercalated with the propeller shaft braking system whereby the latter may be actuated manually for parking or emergency purposes.

Another object of the invention resides in a propeller shaft brake mechanism for a vehicle which may be hydraully actuated and which may be moved manually to brake-setting position without interfering with or impairing operation of the hydraulic brake-setting mechanism.

Another object of the invention resides in the provision of hydraulically actuated propeller shaft braking mechanism for the drive wheels of a vehicle which eliminates use of individual braking mechanisms adjacent the drive wheels whereby a large number of brake components or parts is eliminated.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which:

Figure 1 is a side elevational view of a vehicle of the four-wheel-drive type embodying a form of the invention;

Figure 2 is a top plan view of the vehicle illustrated in Figure 1;

Figure 3 is a sectional view taken substantially on the line 3—3 of Figure 2;

Figure 4 is a sectional view taken substantially on the line 4—4 of Figure 3;

Figure 5 is a sectional view taken substantially on the line 5—5 of Figure 3;

Figure 6 is a fragmentary, detailed sectional view taken substantially in the direction of lines 6—6 of Figure 3, and Figure 7 is an isometric view of an element or lever forming part of the manually operable means for actuating the propeller shaft brake mechanism.

While the braking system and apparatus of the invention are illustrated in the drawings as embodied in a vehicle of the four-wheel-drive type, it is to be understood that the brake arrangement of the present invention may be embodied in any type of vehicle, whether two- or four-wheel drive, which embodies hydraulic braking mechanism.

Referring to the drawings in detail, particularly to Figures 1 and 2, the illustrated vehicle is inclusive of a frame structure 10 comprising longitudinally extending frame members 11 arranged in laterally spaced relation, as shown in Figure 2, and joined by suitable cross members (not shown). The frame supports a body 14 having a cowl portion 15 and bonnet or hood construction 16 enclosing an engine (not shown). The body is equipped with seats 18 and steering wheel 19. A windshield construction 20, pivotally supported upon the cowl portion 15 by means of pins 21, is adapted to be folded in contiguous relation with the hood 16 under certain conditions of vehicle operation.

The vehicle is provided with a pair of front wheels 25 and a pair of rear wheels 26 connected to the frame by means of a pair of leaf springs 27 and a pair of leaf springs 28, respectively. The engine (not shown) is connected by suitable gearing contained in a transmission housing 30 and a supplemental transmission housing or transfer case 32 to a front or forwardly extending propeller shaft 36 adapted to drive the front wheels of the vehicle and to a rearwardly extending propeller shaft 38 to drive the rear wheels. The front propeller shaft is connected with suitable drive gearing and differential mechanism contained within a housing 40 for driving the live axles connected with the front wheels 25. The rear propeller shaft 38 is connected with suitable drive gearing and differential mechanism contained in housing 44 for driving the live axles connected with the rear wheels 26. The ratio of the gear mechanism in transmission housing 30 and transfer case 32 is controlled through levers 46 and 47. A means for establishing and disestablishing drive to the front wheels is controlled through manipulation of a lever 48.

The front wheels 25 are provided with brake drums 50 and brake shoes (not shown) contained therein which are adapted to be hydraulically actuated to effect a braking action on the wheels. Secured to the vehicle frame is a master cylinder 54 containing a piston (not shown) connected by means of rod 55 with a brake pedal or pedal lever 56. The master cylinder 54 is connected with the brake shoe operating means at the front wheels of the vehicle through fluid-conveying or fluid pressure lines or tubes 58 and 59. The master cylinder and lines 58 and 59 are filled with oil or other suitable fluid whereby foot pressure applied to pedal 56 by the operator moves the piston in master cylinder 54 and exerts hydraulic pressure on the fluid in the brake lines or tubes 58 and 59 for moving the brake shoes into frictional contact with the brake drums in the conventional manner.

Mounted at the rear of the transfer case or supplemental housing 32 is a brake mechanism operable upon the propeller shaft 38 which provides the drive or transmission of power to the rear wheels of the vehicle. This braking mechanism is shown in detail in Figures 3 through 7, inclusive. The transfer case or housing 32 is provided with an opening through which extends a shaft 62 splined as shown in Figure 5 to receive a fitting or hub 64 which is secured to shaft 62 by means of a nut 65 mounted upon a threaded tenon 66 forming an extension of shaft 62. Shaft 62 also supports a gear 68 in mesh with a pinion 69 for driving the speedometer and odometer mechanism of the vehicle. Fixedly secured to the supplemental transmission housing 32 by means of bolts 73 is a relatively stationary backing plate 72. Certain of the bolts 73 extend through a flange portion 75 of a brake shoe anchor means or member 76 for securing the anchor means in fixed position as shown in Figures 3 and 4. The anchor member 76 is additionally secured to the brake-backing plate 72 by means of bolt 77 shown in Figure 4.

The arrangement includes a brake drum 80, preferably provided with cooling flanges 81, secured to a plate 83 by means of rivets 84. The plate 83 is secured to the fitting or hub 64 by means of bolts 86 whereby the brake drum 80 rotates with hub 64 and shaft 62. The propeller shaft 38 is connected with hub 64 through the medium of a universal joint mechanism 88, one of the components 89 thereof being illustrated in Figure 5. The component 89 is secured to hub 64 through the medium of the bolts 86. By this means, transmission of power from the engine is established from the gearing in the supplemental transmission housing or transfer case 32 through shaft 62, hub or fitting 64, universal joint mechanism 88, propeller shaft 38 and mechanism in housing 44 to the rear wheels of the vehicle.

A suitable shaft-sealing means for the hub 64 is contained within an annular extension or sleeve 90 formed on the housing 32. The sealing arrangement consists of a closure cup 91 and an annular, flexible sealing member 93, formed of leather, rubber or other flexible material, which is urged into contact with the hub 64 through a coil spring 95 surrounding the flexible sealing member 93. By this means, oil from housing 32 is prevented from escaping along the surface of hub 64.

Disposed within the interior of the brake drum 80 is a pair of brake shoes 98 and 99, provided with brake linings 100 formed of suitable composition, which is adapted to frictionally engage the interior peripheral surface 102 of the brake drum to effect braking action on the drum, which braking action is transmitted to the rear wheels of the vehicle through plate 83, universal joint 88, propeller shaft 38, differential mechanism in housing 44 and the live or drive axles to the rear wheels 26. The anchor member 76 is formed with boss portions 105 having threaded apertures to receive threaded tenons (not shown) of shoe-adjusting members 107. The shoe-adjusting members 107 are in engaging relation with adjacent ends of the brake shoe members 98 and 99 as shown in Figure 3. Each of the members 107 is provided with a disc-like portion 108 having its periphery formed with notches or recesses adapted to be engaged by convolutions of a contractile spring 110, the latter having its ends anchored in openings 112 in brake shoe members 98 and 99. The brake shoes may be adjusted with respect to brake surface 102 by rotating members 107 by a suitable tool to effect adjustment of members 107 relative to the boss portions 105. The spring 110 is arranged to engage the adjacent notches in portions 108, and the tension of the spring functions to hold members 107 in adjusted position. A suitable guide member 114 shown in Figure 4 secured to anchor bracket 76 is provided for the mid-zone of spring 110 to prevent dislodgement of spring 110 during adjustment of members 107.

Hydraulic or fluid pressure means is provided for effecting relative movement of the brake shoes or members 98 and 99 to move the shoes outwardly into frictional or braking engagement with surface 102 of brake drum 80. As particularly shown in Figures 3 and 4, a member 116 is fixedly secured by means (not shown) to the stationary plate 72. Member 116 is formed with a bore 118 in which is fixedly mounted a sleeve 120 defining a cylinder. Reciprocably disposed with the cylinder formed in sleeve 120 are opposed pistons 122, the outer end portions 123 of the pistons being in engagement with projections or extensions 125 formed on brake shoes 98 and 99. Each of the pistons 122 is formed with a flange portion 127 engageable with an end of sleeve 120 for limiting the innermost position of each of the pistons 122. Flexible rubber dust shields 130 are in engagement with the ends of the cylindrical portion of member 116 and the pistons 122 to prevent entrance of foreign matter into the cylinder formed by the sleeve 120. An annular packing or sealing ring 132 is provided on each of the pistons 122 to prevent leakage of fluid along the piston wall.

In their innermost positions, that is, brake-released positions, the pistons 122 are spaced to provide a chamber 134 which is in communication through a duct or passage 136, threaded fitting 137 and a tube or line 138 with the master cylinder 54. Depression of brake-actuating pedal or member 56 exerts pressure on the fluid or oil in the master cylinder 54, which pressure is transmitted through the fluid or oil to the chamber 134 between pistons 122 whereby the pistons are moved outwardly under the influence of the fluid or hydraulic pressure to force hte brakes 98 and 99 outwardly and engage linings 100 with surface 102 of the brake drum to effect braking action on the propeller shaft which is transmitted to the rear wheels. A contractile spring 140 has its ends 141 anchored in suitable openings in the upper zones of brake shoes 98 and 99, as shown in Figure 3, serving to normally bias the shoes out of braking engagement with surface 102 whenever fluid pressure is diminished by removing pressure from the brake pedal 56.

At the same time that the brake mechanism shown in Figures 3 and 4 is actuated by fluid pressure from master cylinder 54, fluid under pressure is impressed in brake lines 58 and 59 to set the brakes on the front wheels of the vehicle. Thus, through the use of three braking units (one on each front wheel and one on the propeller shaft), braking action is provided on all four vehicle wheels. The sleeve 120 is formed with an opening 144 which by means of duct 145 is in communication with a fitting 146. The fitting 146 is adapted for bleeding air from the fluid lines so that the fluid lines and the space or chamber 134 contain only liquid or oil during normal use.

The braking arrangement on the propeller shaft is adapted to be operated by manual means, independent of the hydraulic means, whereby the braking means on the propeller shaft may be set manually as a parking or emergency brake means. As particularly shown in Figures 3 and 6, the brake shoe 98 is formed with an extension 148 having a V-shaped projection 149 formed at its end. The brake shoe 99 is formed with a similarly shaped extension 150 whose central end zone is provided with a recess or notch 151 to accommodate projection 149. Disposed between the extensions 148 and 150 is a means for moving brake shoes 98 and 99 outwardly to set the brake. Such means is in the form of a member or lever 155 illustrated in Figure 7 and is inclusive of two spaced, parallel wall portions 156 and 157 joined integrally by portions 158 and 159 as shown in Figure 7. Portions 158 and 159 are spaced apart to provide a slot or space 169 through which extends projection 149 as shown in Figure 6. The member or lever 155 is illustrated in Figure 6 in assembled relation with the brake shoes, the joining portions 158 and 159 lying between and in engagement with end zones or edge surfaces of extensions 148 and 150 of the brake shoes. It should be noted that the recess 151 in extension 150 is formed to provide ample clearance for projection 149 so that lever or member 155 may be oscillated in a plane parallel to the walls 156 and 157 without any binding of projection 149 in recess 151. The end zones of wall portions 156 and 157 are provided with aligned, circular openings 160 which receive a pin or stub shaft 161 which also extends through a slot 162 formed in the end zone of one arm 163 of a bell crank member or lever 164. The arm 163 extends into the space between walls 156 and 157 of member 155. The member 164 is fulcrumed upon a shaft or pin 165 secured to the transfer case or housing 32. The arm 166 of bell crank member 164 is joined by means of pin or stub shaft 167 with the end zone of a member 168 which is secured to one extremity of a cable 170 shown in Figures 1 and 2. The other end of the cable is secured to a brake-actuating, pull-type member 172 which is longitudinally movable for manually actuating the brake shoes 98 and 99. The brake-actuating member 172 is equipped with a handle or grip member 173 so that the operator may conveniently reciprocate member 172 to effect a settting or disengagement of the brake shoes with braking surface 102. A pawl means (not shown) is provided to hold the member 172 in brake-setting position. The cable 170 is enclosed in and suitably guided by a sheath 175 illustrated in Figures 1 and 2.

The braking mechanism of the vehicle functions as follows. For normal service braking the vehicle operator depresses the pedal or pedal lever 56, the movement of the pedal being transmitted through the push rod 55 to the piston within master cylinder 54 to move the piston in a direction forwardly of the vehicle. As the master cylinder and the brake lines 58 and 59 are filled with oil or other fluid, pressure on the piston is transmitted by the fluid to the brake mechanisms associated with front wheels 25 to set the brakes on the front wheels. The fluid pressure is also communicated through line or tube 138 to the brake mechanism associated with the propeller shaft 38 into the space 134 between pistons 122 in cylinder 120, causing the pistons to move away from each other. As pistons 122 are in contact with projections 125 on brake shoes 98 and 99, the brake shoes are moved outwardly to force the brake linings 100 into frictional engagement with surface 102 of brake drum 80. As the brake drum is secured to hub 64 and universal joint mechanism 88, the braking action on drum 80 is transmitted through the universal joint mechanism, rear propeller shaft 38, differential mechanism in housing 44 and rear live axles to effect braking action on both rear wheels 26 of the vehicle. The brake reaction on the front wheels of the vehicle is transmitted to the vehicle frame through leaf springs 27, and the brake reaction on the rear wheels is transmitted to the vehicle frame through leaf springs 28.

Upon release of pressure by the operator on the pedal 56, a spring (not shown) connected to the pedal retracts the latter to its normal position. By thus releasing fluid pressure acting against pistons 122, the spring 140, connecting brake shoes 98 and 99, causes the brake shoes to be drawn inwardly and effects a disengagement of brake linings 100 from the brake drum 80.

The above-described, normal hydraulic braking action effective to move brake shoes 98 and 99 is operative independently of arm or lever 155 shown in Figures 3, 4 and 6. During their outward movement the brake shoes are maintained substantially in aligned relation by reason of projection 149 extending into recess 151 shown in Figure 6.

When it is desired to effect manual operation of brake shoes 98 and 99 for parking purposes, the operator grasps handle portion 173 of pull member 172 shown in Figure 1 and, exerting a pull thereon, causes relative movement of the actuating cable 170. Movement of the cable causes pivotal movement of bell crank 164 around its supporting fulcrum or pin 165 in a counterclockwise direction as viewed in Figure 6; and through the pin-and-slot connection of arm 163 of the bell crank with member or lever 155, the latter is caused to be tilted or rocked to effect a setting of the brake mechanism. As arm 163 moves upwardly, the arm or lever 155 swings through an arc about the portion 158 as a fulcrum as the portion 158 is in engagement with the end portion of projection 150 formed on brake shoe 99. As arm or lever 155 swings around portion 158 as a fulcrum, portion 159, being in engagement with the end zone of projection 148, exerts pressure upon projection 148 and brake shoe 98 to move the brake shoe outwardly. Through this action the brake linings 100 on shoes 98 and 99 are brought into frictional, braking engagement with surface 102 of brake drum 80. In this manner, braking force is transmitted through the drum 80, universal joint mechanism 88, propeller shaft 38 and rear live axles to the rear wheels 26 of the vehicle. As previously mentioned, the projection 149 is of smaller dimension than recess 151, shown in Figure 6, to facilitate tilting movement of arm or lever 155 without incurring binding action between projection 149 and the walls of the recess 151.

When the operator desires to release braking force on the rear wheels, the pull member 172 is released by actuation of a pawl means (not shown), member 172 being moved forwardly of the vehicle as viewed in Figure 1. This movement of member 172 effects reverse movement of cable 170 so that the lever or member 155 is returned to its normal, brake-released position as shown in Figure 6. The contractile spring 140 connected with brake shoes 98 and 99, withdraws the brake shoes inwardly, thus disengaging brake linings 100 from frictional contact with brake drum 80 to release the braking force effective on the rear wheels of the vehicle. It should be noted that manual actuation of the brake shoes 98 and 99 through tilting movement of lever or member 155 is operable independently of the hydraulic brake actuating mechanisms hereinbefore described.

Through the arrangement of the invention, hydraulic braking force is exerted upon all four vehicle wheels through three brake-setting units as contrasted with previous, conventional hydraulic mechanism operable upon four brake-setting units. Manual actuation of the brake mechanism for emergency or parking brake purposes is effected by manipulation of only one brake unit, mounted on the propeller shaft or power transmission mechanism of the vehicle, which is effective to transmit braking force to both rear wheels of the vehicle.

It is apparent that, within the scope of the invention, modifications and different arrangements may be made other than is herein disclosed, and the present disclosure is illustrative merely, the invention comprehending all variations thereof.

I claim:

1. In combination with a vehicle having a pair of road wheels driven from a prime mover through a propeller shaft, a brake means associated with the propeller shaft including a drum member rotatable with the propeller shaft and constituting the sole braking means for the pair of road wheels, brake shoe means engageable with said drum member for transmitting braking force through the propeller shaft to the road wheels driven thereby, hydraulic means for actuating the brake shoe means into engagement with the drum member to establish braking forces thereon, said hydraulic means comprising piston and cylinder means located adjacent said brake shoe means for moving the shoe means, a master cylinder connected through an open line to said piston and cylinder means, and means for actuating said master cylinder to supply fluid under pressure to said piston and cylinder means, so that said brake shoe means is operable at all times in response to actuation of said hydraulic means, and manually operable means connected to said brake shoe means independently of said hydraulic means and operative independently of said hydraulic means for actuating the brake shoe means into engagement with the drum member to establish braking forces thereon.

2. In a vehicle having first and second pairs of road wheels, hydraulically operable individual brake assemblies operatively associated with each road wheel in said first pair, propeller shaft means arranged in a driving relation with said second pair, and a housing for said shaft means; a brake drum mounted on said shaft means, said brake drum extending about said shaft means in a coaxial relation therewith, brake shoe members pivotally supported on said housing and arranged within said drum for movement into frictional engagement with said drum for transmitting braking forces through the propeller shaft means to said second pair of road wheels driven thereby, a cylinder member mounted on said housing, opposed piston members mounted in said cylinder member and arranged in pressure engagement with a pair of adjacent ends of said shoe members for moving each of said shoe members in one direction into frictional engagement with said drum, a master cylinder connected through an open line to said cylinder member, and means for actuating said master cylinder to supply fluid under pressure to said cylinder member so that said brake shoe members are movable into frictional engagement with said drum each time said master cylinder is actuated, means connecting said individual brake assemblies with said master cylinder so that said individual brake assemblies are supplied with fluid concurrently with the supply of fluid to said cylinder member, and manually operable means connected to said brake shoe members independently of said opposed pistons and operative independently of said pistons for moving the brake shoe members into engagement with the drum to establish braking forces thereon.

References Cited in the file of this patent
UNITED STATES PATENTS

| | | |
|---|---|---|
| 1,567,699 | Bendix | Dec. 29, 1925 |
| 1,880,477 | Ragsdale | Oct. 4, 1932 |
| 2,015,704 | Bittner | Oct. 1, 1935 |
| 2,192,012 | La Brie | Feb. 27, 1940 |
| 2,328,685 | Schnell | Sept. 7, 1943 |
| 2,345,107 | Goepfrich | Mar. 28, 1944 |
| 2,642,159 | House | June 16, 1953 |